(12) United States Patent
Christmas

(10) Patent No.: US 6,321,523 B1
(45) Date of Patent: Nov. 27, 2001

(54) CHAIN

(75) Inventor: Michael Charles Christmas, Cheshire (GB)

(73) Assignee: Renold PLC, Manchester (GB)

( * ) Notice: Subject to any disclaimer, the term of this patent is extended or adjusted under 35 U.S.C. 154(b) by 0 days.

(21) Appl. No.: 09/528,455

(22) Filed: Mar. 17, 2000

(30) Foreign Application Priority Data

Mar. 30, 1999 (GB) .................................................. 9907173

(51) Int. Cl.⁷ .................................................. F16G 13/06
(52) U.S. Cl. .................. 59/4; 59/5; 59/78; 474/209; 198/851
(58) Field of Search .................. 59/4, 5, 35.1, 78; 474/209; 198/850, 851

(56) References Cited

U.S. PATENT DOCUMENTS 2,613,546 * 10/1952 Jorgensen ........................ 474/209
4,134,189 * 1/1979 Richter ........................... 198/851

FOREIGN PATENT DOCUMENTS

2573832 * 5/1986 (FR) .................................................. 59/5
2171170 * 8/1986 (GB) .................................................. 59/4

OTHER PUBLICATIONS

Renold Product Catalogue, pp. 90, 196, and 209

* cited by examiner

Primary Examiner—David Jones
(74) Attorney, Agent, or Firm—Akin Gump Strauss Hauer & Feld, LLP

(57) ABSTRACT

A chain comprises inner link plates that are each connected to an adjacent outer link plate by means of at least one pin that passes through overlapping portions of the respective links. Outboard of the inner link plates the pin supports a rotary bush with a radially extending flange. The bush in turn supports one end of an outer link plate and a roller. The outer link plate is an interference fit with the bush and the roller is rotatable relative thereto. In use the rollers are supported on a guide rail as the chain moves. The location of the bush bearing and roller provides easy access for maintenance and lubrication.

15 Claims, 1 Drawing Sheet

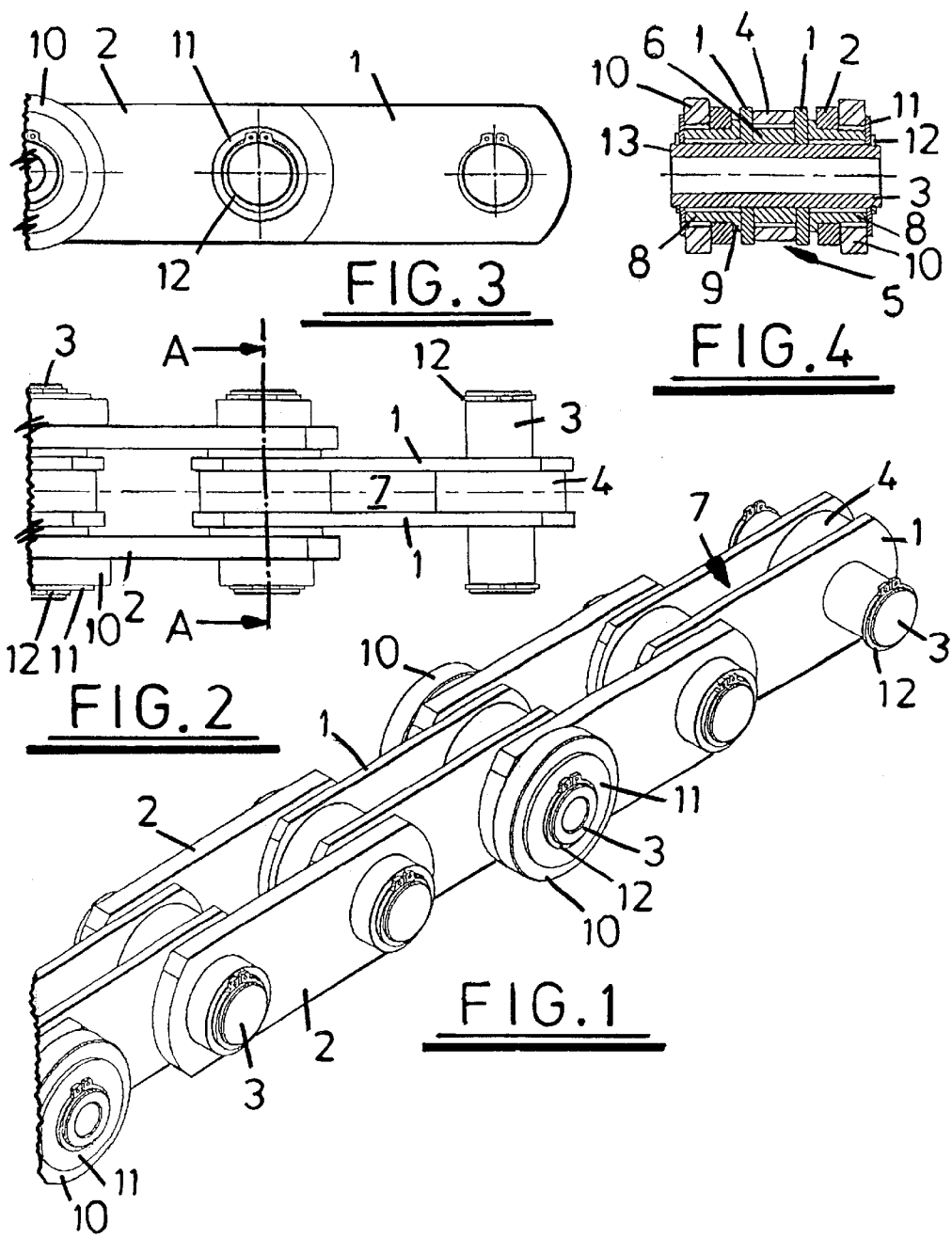

CHAIN

CROSS-REFERENCE TO RELATED APPLICATION

Priority is claimed to British Patent Application No. 9907173.0, filed Mar. 30, 1999.

BACKGROUND OF THE INVENTION

The present invention relates to a chain and in particular to a chain having an outboard roller of the kind that is used to support the chain on guide rails or tracks.

Chains of the kind referred to above are used for many purposes such as to support parts of a moving platform, conveyor or escalator.

The construction of such a chain is broadly similar to the conventional roller chain having inner and outer link plates interconnected by pins that pass through aligned apertures therein. A central roller is disposed on each pin between opposed pairs of inner link plates. The outer link plates are fixed relative to the pin by means of an interference fit and the inner link plates articulate relative to the pin as they are assembled thereto with a clearance fit. The pins each extend laterally outboard of the outer link plates and each end supports a rotary outboard roller. In use, the outboard rollers are in rolling contact with guide rails or tracks disposed on one or both sides for the chain.

Lubrication or maintenance of the bearing surface between the articulating inner link plates and the pin is difficult as access is restricted by the presence of the outboard roller and the elements which the chain is supporting.

SUMMARY OF THE INVENTION

According to the present invention there is provided a chain comprising inner link plates that are each connected to an adjacent outer link plate by means of at least one pin that passes through overlapping portions of the respective links, wherein the pin supports a rotary bearing surface outboard of the inner link plate, on which surface are mounted the outer link plate and a roller.

Preferably the outer link plate is connected to the bearing surface by an interference fit whereas the roller is rotatable thereto.

The rotary bearing surface may be a bush with a radially outward extending flange.

The bush may be retained on the pin by an annular retaining member such as a circlip or a combination of a washer and circlip. The outer link plate and the roller are therefore retained between the flange and the annular retaining member.

The inner link plates are preferably an interference fit on the pin.

A specific embodiment of the present invention will now be described, by way of example only, with reference to the accompanying drawings in which:

FIG. 1 is a perspective view of part of a chain according to the present invention;

FIG. 2 is a plan view of the chain of FIG. 1;

FIG. 3 is a side view of the chain of FIG. 2; and

FIG. 4 is a view in cross-section through line A—A of FIG. 2.

DETAILED DESCRIPTION OF THE INVENTION

Referring now to the drawings, the chain comprises a plurality of overlapping inner and outer link plates 1, 2 interconnected by pins 3.

The inner link plates 1 are arranged in opposed pairs and each pair is secured to a pin 3 by means of an interference fit with apertures in the plates 1, 2. A central roller 4 is disposed in a clearance 5 between the inner link plate pairs and is mounted on a bearing bush 6. The space 7 defined between adjacent central rollers 4 is intended to receive a tooth of a driving sprocket (not shown).

Immediately outboard of the inner link plates 1 rotary bushes 8 are coaxially disposed on the pins 3. At the end adjacent the inner link plate 1 each rotary bush 8 has a radially outward extending flange 9 around the full circumference of the bush 8. The outer circumferential surface of the bush 8 supports one end of an outer link plate 2 and an outer roller 10. The outer link plate 2 is disposed between the outer roller 10 and the flange 9 and is an interference fit with the bush 8 so that it rotates therewith. The outer roller 10 on the other hand is free to rotate relative to the bush 8. The outer roller 10 and bush 8 are retained on the pin 3 by a washer 11 and circlip 12 secured over the projecting end 13 of the pin 3.

In the figures the outer rollers 10 are shown on every third pin 3 along the chain. It will be understood that the number of guide rollers 10 per chain is optional and dependent on the application.

In use, the outer rollers 10 run on rails (not shown) supporting the outer rollers 10 from below along a path on which the chain is intended to run. In some applications rails may also be provided above the rollers.

By supporting the outer link plate 2 and the outer roller on a rotary bush 8 outboard of the inner link plates 1 the bearing area is positioned in a more accessible place as compared to a conventional roller chain, thereby making sealing, lubrication and maintenance easier. In particular, the design allows the rotary bush, outer link and roller to be removed as an ensemble without difficulty so as to permit easy maintenance.

What is claimed is:

1. A chain comprising:

at least two inner link plates connected by a pin;

a rotary bearing surface rotatably mounted to said pin and located outboard of each inner link plate;

an outer link plate secured to said rotary bearing surface; and a roller attached to said rotary bearing surface.

2. A chain according to claim 1, wherein said outer link plate is secured to said bearing surface by an interference fit.

3. A chain according to claim 2, wherein said rotary bearing surface is a bush.

4. A chain according to claim 2, wherein said inner link plates are connected to said pin by an interference fit.

5. A chain according to claim 1, wherein said inner link plates are connected to said pin by an interference fit.

6. A chain according to claim 1, wherein said rotary bearing surface is a bush.

7. A chain according to claim 3, wherein said bush is retained on said pin by an annular retaining member.

8. A chain according to claim 7, wherein said inner link plates are connected to said pin by an interference fit.

9. A chain according to claim 7, wherein said outer link plate is secured to said bearing surface by an interference fit.

10. A chain according to claim 3, wherein said inner link plates are connected to said pin by an interference fit.

11. A chain according to claim 10, wherein said outer link plate is secured to said bearing surface by an interference fit.

12. A chain according to claim 6, wherein said bush includes a radial flange near said inner link plates.

13. A chain according to claim 12, wherein said outer link plate and said roller are contained between said flange and said annular retaining member.

14. A chain according to claim 13, wherein said inner link plates are connected to said pin by an interference fit.

15. A chain according to claim 4, wherein said outer link plate is secured to said bearing surface by an interference fit.

* * * * *